(12) United States Patent
Maeda et al.

(10) Patent No.: US 7,813,533 B2
(45) Date of Patent: Oct. 12, 2010

(54) OPERATION-DISCERNING APPARATUS AND APPARATUS FOR DISCERNING POSTURE OF SUBJECT

(75) Inventors: Masahiro Maeda, Kanagawa (JP); Noriji Kato, Kanagawa (JP); Hitoshi Ikeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1213 days.

(21) Appl. No.: 10/958,430

(22) Filed: Oct. 6, 2004

(65) Prior Publication Data

US 2005/0074167 A1    Apr. 7, 2005

(30) Foreign Application Priority Data

Oct. 6, 2003    (JP)    ............... 2003-347146

(51) Int. Cl.
  *G06K 9/00*    (2006.01)
  *G06K 9/46*    (2006.01)
  *G06K 9/66*    (2006.01)
  *H04N 7/14*    (2006.01)

(52) U.S. Cl. ............ 382/118; 382/103; 382/165; 382/190; 348/14.08

(58) Field of Classification Search ............... 382/118, 382/103, 165, 190; 348/14.08
  See application file for complete search history.

(56) References Cited

U.S. PATENT DOCUMENTS

| | | | | |
|---|---|---|---|---|
| 5,912,980 A | * | 6/1999 | Hunke ................. | 382/103 |
| 6,297,846 B1 | * | 10/2001 | Edanami ............... | 348/239 |
| 6,298,145 B1 | * | 10/2001 | Zhang et al. .......... | 382/103 |
| 6,940,545 B1 | * | 9/2005 | Ray et al. ............ | 348/222.1 |
| 7,003,135 B2 | * | 2/2006 | Hsieh et al. .......... | 382/103 |
| 7,142,600 B1 | * | 11/2006 | Schonfeld et al. ..... | 375/240.16 |
| 7,200,249 B2 | | 4/2007 | Okubo et al. | |
| 7,317,817 B2 | | 1/2008 | Okubo et al. | |
| 7,352,880 B2 | * | 4/2008 | Kim et al. ............ | 382/103 |
| 7,508,961 B2 | * | 3/2009 | Chen et al. ........... | 382/118 |
| 2002/0113862 A1 | * | 8/2002 | Center et al. ......... | 348/14.08 |
| 2004/0004670 A1 | * | 1/2004 | Yamashita ............. | 348/345 |
| 2004/0017930 A1 | * | 1/2004 | Kim et al. ............ | 382/103 |
| 2005/0047656 A1 | * | 3/2005 | Luo et al. ............ | 382/167 |

(Continued)

FOREIGN PATENT DOCUMENTS

EP    684736 A2 * 11/1995

(Continued)

OTHER PUBLICATIONS

Birchfield, S.—"Elliptical head tracking using intensity gradients and color histograms"—IEEE—1998.*

*Primary Examiner*—Bhavesh M Mehta
*Assistant Examiner*—Bernard Krasnic
(74) *Attorney, Agent, or Firm*—Oliff & Berridge, PLC

(57) ABSTRACT

The recognition apparatus shoots pictures of at least a portion of a subject including a human face and obtains a sequence of image data. The facial portion is recognized from the image data. Each image data in the sequence of image data is processed successively. From the image data, an image region including the facial portion is identified. Either a color of the subject within a region defined based on the identified image region or the result of detection of moving regions is used for processing for identifying the image region including the facial portion.

9 Claims, 3 Drawing Sheets

U.S. PATENT DOCUMENTS

2005/0084141 A1 * 4/2005 Kato et al. ............... 382/118

FOREIGN PATENT DOCUMENTS

| JP | 06-168330 | 6/1994 |
| JP | 09-044680 | 2/1997 |
| JP | A-2000-105819 | 4/2000 |
| JP | 2002-157596 | 5/2002 |
| JP | 2003-281539 | 10/2003 |

* cited by examiner

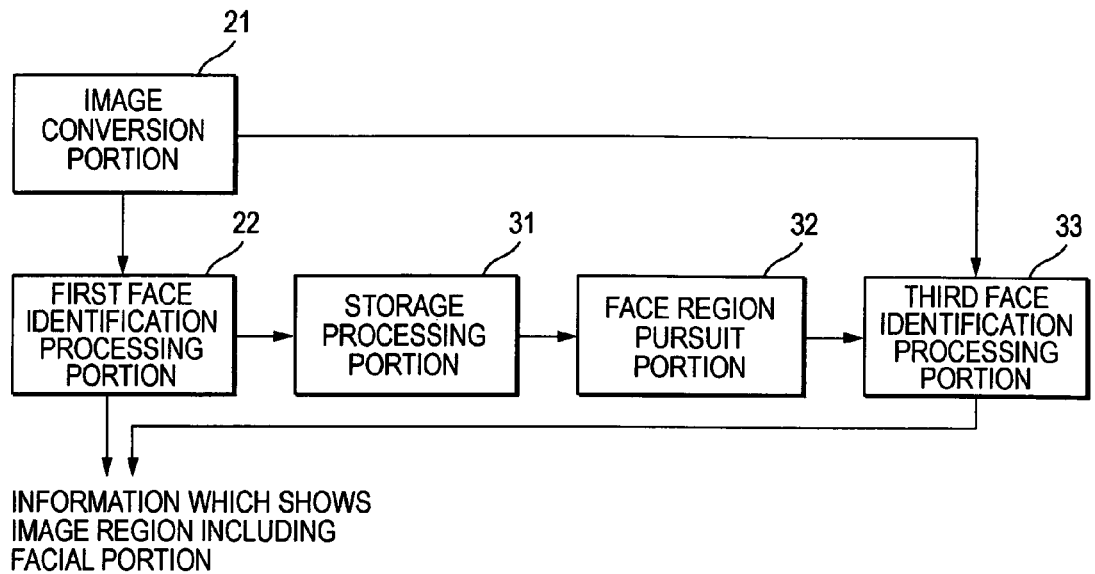

OPERATION-DISCERNING APPARATUS AND APPARATUS FOR DISCERNING POSTURE OF SUBJECT

CROSS REFERENCE TO RELATED APPLICATIONS

This application claims the benefit of Japanese Patent Application No. 2003-347146, filed on Oct. 6, 2003. The disclosure of the prior application is hereby incorporated by reference herein in their entirety.

BACKGROUND OF THE INVENTION

1. Field of the Invention

The present invention relates to a recognition apparatus for outputting information about a given portion of a subject such as a human face.

2. Background Art

Various kinds of processing for recognizing a given portion of a subject such as a human face from within image data have been conventionally conceived. For example, JP-A-2000-105819 discloses an apparatus that performs an example of processing for detecting a facial portion, the processing consisting of a combination of detection of moving regions and detection of skin color.

However, where detection of a face is performed using portions of skin color, the effects of various factors (e.g., variations in skin color among individuals, variations due to illuminating conditions, and the presence of background regions having colors similar with skin color) must be taken into account. In particular, where variations in skin color among individuals are considered, it is necessary to widen a color range that is regarded as skin color. If this range is widened, the probability that regions of the identical color are erroneously discovered from inside the background increases. In this way, where only a color of the subject such as skin color is utilized, there is the problem that the recognition accuracy cannot be improved with ease.

Furthermore, detection of moving regions is a kind of processing involving heavy load. Where the whole image data is processed in this way, the processing load is increased.

SUMMARY OF THE INVENTION

The present invention has been made in view of the foregoing circumstances. It is an object of the invention to provide a recognition apparatus capable of improving the recognition accuracy while suppressing increase in the processing load.

The present invention for solving the problem with the foregoing prior art example provides a recognition apparatus for taking a sequence of image data, which has been obtained by shooting pictures including at least a portion of a person containing the face, and recognizing a facial portion of the person from the image data, the recognition apparatus including: a facial portion-identifying unit for identifying an image region including the facial portion of the person from each image data in the sequence of image data successively; a unit for obtaining information about skin color of the person from pixel values within the identified image region; and a storage unit for storing the obtained information about skin color. The facial portion-identifying unit processes the identification of the image region including the facial portion from currently processed image data by using the information about skin color stored in the storage unit, the information about skin color being obtained from previously processed image data.

The present invention for solving the problem with the foregoing prior art example provides another recognition apparatus for taking a sequence of image data, which has been obtained by shooting pictures including at least a portion of a person containing the face, and recognizing a facial portion of the person from the image data, the recognition apparatus including: a facial portion-identifying unit for identifying an image region including the facial portion of the person from each image data in the sequence of image data successively; a unit for detecting state of movement of a candidate region within image data, the candidate region being determined based on information representing the image region including the identified facial portion, the image region being represented by image data previously processed; and a facial portion region estimation unit for estimating the image region including the facial portion within current image data, based on the detected state of movement.

There may be further provided: a unit for obtaining information about skin color of the person from pixel values within the image region identified by the facial portion-identifying unit; and a storage unit for storing the obtained information about skin color. The facial portion-identifying unit processes the identification of the image region including the facial portion from currently processed image data by using the information about skin color stored in the storage unit, the information about skin color being obtained from previously processed image data.

When the image region including the facial portion cannot be identified by a first recognition method not using information about skin color, the facial portion-identifying unit may identify the image region including the facial portion by a second recognition method using the information about skin color.

The present invention for solving the problem with the prior art example provides a recognition apparatus for recognizing a subject by shooting the subject and taking a sequence of image data, the recognition apparatus including: a subject portion-identifying unit for identifying an image region including the subject from each image data in the sequence of image data successively; a unit for obtaining information about a color of the subject from pixel values within the identified image region; and a storage unit for storing the obtained information about the color. The subject portion-identifying unit processes the identification of the image region including the portion of the subject from currently processed image data by using the information about color stored in the storage unit, the information about color being obtained from previously processed image data.

The present invention for solving the problem with the prior art example provides a further recognition apparatus for recognizing a subject by shooting the subject and taking a sequence of image data, the recognition apparatus including: a subject portion-identifying unit for identifying an image region including the subject from each image data in the sequence of image data successively; a unit for detecting state of movement of a candidate region within image data previously processed, the candidate region being determined based on information representing the image region including the identified portion of the subject; and a subject portion region estimation unit for estimating the image region including the portion of the subject based on the detected state of movement, the image region being represented by current image data.

A method according to one aspect of the present invention is a method of recognizing a facial portion of a person by taking a sequence of image data, which has been obtained by shooting pictures including at least a portion of the person containing the face, and recognizing the facial portion of the person from the image data, using a computer, the method including the steps of: identifying an image region including the facial portion of the person from each image data in the sequence of image data successively; obtaining information about skin color of the person from pixel values within the identified image region; and storing the obtained information about skin color into a storage unit. In the step of identifying the facial portion, the stored information about skin color that is associated with image data previously processed is used for processing for identification of the image region including the facial portion, the image region being represented by current image data.

A method according to one aspect of the present invention is a method of recognizing a facial portion of a person by taking a sequence of image data, which has been obtained by shooting pictures including at least a portion of the person containing the face, and recognizing the facial portion from the image data, using a computer, the method including the steps of: identifying an image region including the facial portion of the person from each image data in the sequence of image data successively; detecting state of movement of a candidate region within image data previously processed, the candidate region being determined based on information representing the image region including the identified facial portion; and estimating the image region including the facial portion within current image data, based on the detected state of movement.

A program according to another aspect of the present invention is a method for recognizing a facial portion of a person by taking a sequence of image data, which has been obtained by shooting pictures including at least a portion of the person containing the face, and recognizing the facial portion from the image data, the program including the steps of: causing a computer to perform a procedure of identifying an image region including the facial portion of the person from each image data in the sequence of image data successively; causing the computer to perform a procedure of obtaining information about skin color of the person from pixel values within the identified image region; and causing the computer to perform a procedure of storing the obtained information about skin color into a storage unit. In the procedure of identifying the facial portion, the stored information about skin color associated with image data previously processed is used for processing for identification of the image region including the facial portion represented by current image data.

A program according to a still other aspect of the invention is a program for recognizing a facial portion of a person by taking a sequence of image data, which has been obtained by shooting pictures including at least a portion of the person containing the face, and recognizing the facial portion from the image data, the program including the steps of: causing a computer to perform a procedure of identifying an image region including the facial portion of the person from each image data in the sequence of image data successively; causing the computer to perform a procedure of detecting state of movement of a candidate region within image data previously processed, the candidate region being determined based on information representing the image region including the identified facial portion; and causing the computer to perform a procedure of estimating the image region including the facial portion within the current image data based on the detected state of movement.

BRIEF DESCRIPTION OF THE DRAWINGS

These and other objects and advantages of this invention will become more fully apparent from the following detailed description taken with the accompanying drawings in which:

FIG. 3 is a functional block diagram showing examples of processing of a recognition apparatus according to a second embodiment of the invention;

FIG. 4 is an explanatory view illustrating one example of table used where a recognition apparatus of the present invention is used for processing for estimating an operation.

DETAILED DESCRIPTION OF THE PREFERRED EMBODIMENTS

First Embodiment

Figure 1:
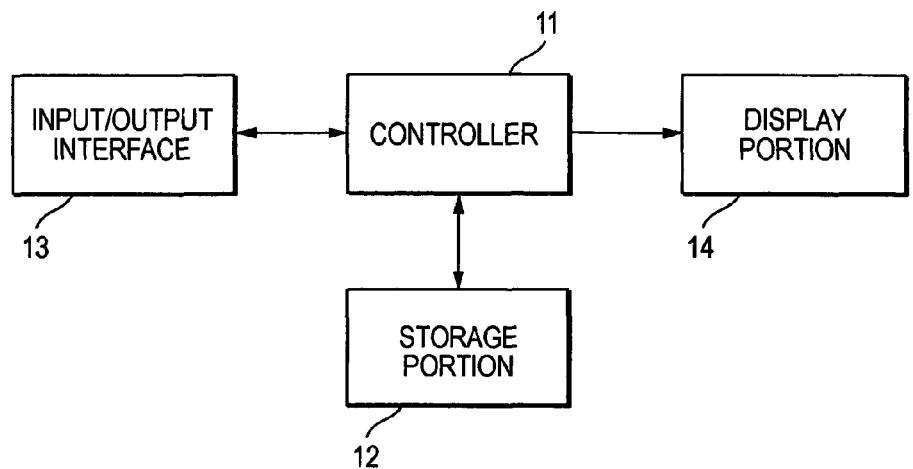
FIG. 1 is a block diagram of the structure of a recognition apparatus according to a first embodiment of the present invention.

A first embodiment of the present invention is described with reference to the drawings. An operation-recognizing apparatus according to the present embodiment is designed to include a controller 11, a storage portion 12, an input/output interface 13, and a display portion 14 as shown in FIG. 1.

The controller 11 operates according to a program loaded in the storage portion 12 and is fundamentally executing processing (face identification processing) for identifying an image of a facial portion from image data obtained from the outside. The contents of the processing will be described in detail later.

The storage portion 12 is a computer-readable recording medium in which a program executed by the controller 11 is loaded. This storage portion 12 operates also as a working memory for storing various kinds of data necessary during processing of the controller 11. The input/output interface 13 is connected with an external device such as a camera device, successively obtains image data from the external device, and outputs the data to the controller 11. The input/output interface 13 outputs various kinds of data to the external device according to instructions entered from the controller 11. The display portion 14 is a display device, for example, and displays information according to instructions entered from the controller 11.

Figure 2:
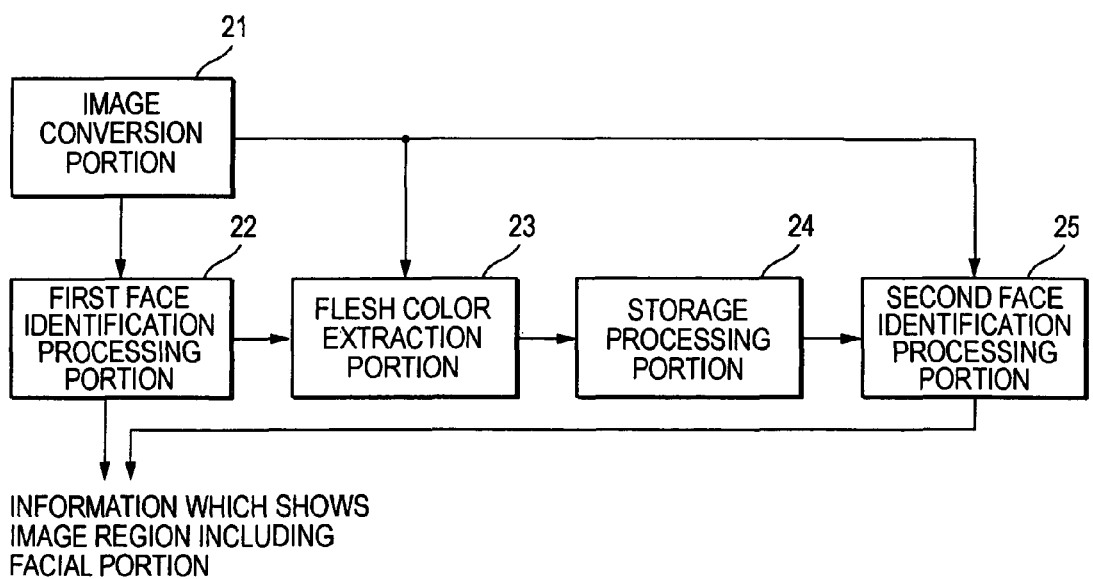
FIG. 2 is a functional block diagram showing examples of processing of the recognition apparatus according to the first embodiment of the invention.

The program executed by the controller 11 functionally includes, as shown in FIG. 2, an image conversion portion 21, a first face identification processing portion 22, a skin color extraction portion 23, a storage processing portion 24, and a second face identification processing portion 25. The image conversion portion 21 converts a sequence of image data, which is obtained via the input/output interface 13 and to be processed, into corresponding grayscale image data (grayscale data) and outputs the data to the first face identification processing portion 22. Furthermore, the image conversion portion 21 outputs the image data to be processed to the skin color extraction portion 23 and to the second face identification processing portion 25.

The first face identification processing portion 22 performs processing for identifying an image region including a facial portion by a first recognition method which does not use information about color (such as information about skin color). In this embodiment, processing for identifying a facial portion from grayscale data entered from the image conversion portion 21 is performed particularly. As described later, the first face identification processing portion 22 may recognize the facial portion within image data based on data obtained previously by learning. Furthermore, the first face identification processing portion 22 may identify the sense of the face (three-dimensional sense) or size, in addition to the position of the face. This processing for identification of the face will also be described later.

The skin color extraction portion 23 extracts a partial image of a region corresponding to the facial portion identified by the first face identification processing portion 22 out of image data entered from the image conversion portion 21. The extraction portion 23 calculates information about the average color of the partial image and outputs the information as information about skin color. In particular, a histogram of pixel values of pixels contained in a region defined by the region information that is output from the first face identification processing portion 22 is output as information about skin color. This information about skin color provides a histogram of colors of the facial portion (i.e., color or colors of the skin of the face) identified by the first face identification processing portion 22. This information provides, so to speak, information about skin color of this person. The apparatus of the present embodiment extracts the skin color of the subject and further identifies the facial portion utilizing the information. The storage processing portion 24 stores the skin color information delivered by the skin color extraction portion 23 into the storage portion 12.

The second face identification processing portion 25 searches for a portion of skin color, using a separately specified search region as a starting point (initial value), by the use of information about skin color, the information being stored in the storage portion 12. In the present embodiment, the second face identification processing portion 25 may use an image region including a facial portion identified within immediately previously entered image data.

Specifically, the second face identification processing portion 25 finds the center of gravity of the portion of the color (hereinafter referred to as the color of the subject) identified by the skin color information stored in the storage portion 12 from the portion included in the search region out of the image data, using the values of pixels within the search region and the skin color information stored in the storage portion 12. The processing portion defines a new search region about the center of gravity. This search region may be set identical in size and shape with the search-starting region.

Subsequently, the processing for finding the center of gravity of the portion of the color intrinsic to the subject and the processing for moving the search region are repeatedly carried out within the similarly and newly defined search region until the distance between the newly found center of gravity and the immediately previously found center of gravity decreases below a given value (i.e., until the search region is converged). Where convergence into a predetermined repetition number is not achieved, it may be judged that no facial portion is detected. Then, repetition of the processing may be ended.

When the search region is converged, the second face identification processing portion 25 identifies the search region obtained after the convergence as an image region including the facial portion.

The center of gravity of color can be calculated, for example, as described below. That is, the difference between each pixel value within the search region and the color intrinsic to the subject is calculated (where each pixel value has three components, the square root of the sum of the squares of the differences between the components may be used). The product of a vector from a given position (e.g., the center of the search region) to each pixel and the difference between the value of the pixel and the color intrinsic to the subject is calculated. The total sum of the vectors obtained by such products is calculated. A displacement from the given position that is represented by a vector obtained by the total sum is taken as the center of gravity of color.

The operation of the first face identification processing portion 22 is now described. The first face identification processing portion 22 may extract a portion corresponding to a human face from within the image data, using a first database obtained, for example, by learning human faces. At this time, images (normal images) of forward facing faces in an erect posture are prepared. Each of the normal images is rotated right and left through a given angle. In this way, plural face images are prepared. The apparatus is made to learn these face images, and a second database is previously prepared by the learning. A region that will be a candidate of a facial portion is identified by a given method (e.g., an amount of features based on pixel values within the region (such as entropy) is used). Using the second database, the image within the region that becomes a candidate of the facial portion is converted such that it approaches the normal image (normalization). Using the information within the first database, a decision may be made as to whether data about the image within the region after the normalization is an image representing a human face. This makes it possible to judge the rotational angle during the processing of normalization. Consequently, it is possible to quickly judge whether it is a face by the processing of normalization. The rotational angle obtained by this process is produced as an output. As a result, the angle can be used for processing utilizing the sense of the face as described above.

The recognition apparatus of the present embodiment has the structure described above and operates as follows. When a sequence of image data taken by the external device such as a camera is entered into the recognition apparatus of the present embodiment in a time-sequenced manner via the input/output interface 13, the controller 11 first performs the processing of the image conversion portion 21 in accordance with the program loaded in the storage portion 12. The image data is held in the storage portion 12. The image data is converted into grayscale data while dealing with the image data as successively current image data. The grayscale data is held in the storage portion 12.

The controller 11 then starts the processing of the first face identification processing portion 22, fetches grayscale data of the current image data from the storage portion 12, and identifies the candidate of the facial portion using the amount of features of the pixel block such as entropy as described above. Then, using the second database obtained by learning, the image of the candidate of the facial portion is converted and normalized. Using the obtained data and information within the first database obtained by learning of facial images, a decision is made as to whether the image within the region that is a candidate of the facial portion after the normalization is an image of a face. If so, the region that is the candidate is identified as an image region including the facial portion. If the result of the decision is that it is not an image of a face, the processing is repeated from the normalization step about other candidates of facial portions. Where no images of facial portions are recognized regarding all the candidates of facial portions obtained from the grayscale data, it follows that information to the effect that recognition of facial portions has failed is output.

The controller 11 takes image data (current image data) corresponding to the grayscale data processed by the first face identification processing portion 22 from the storage portion 12, calculationally obtains information about the average color within the region corresponding to the region identified by the first face identification processing portion 22 on the image data, takes the obtained information as information about skin color intrinsic to the recognized person, and stores the information about the color intrinsic to the subject in the storage portion 12 by the processing of the storage processing portion 24.

Where predetermined conditions are satisfied, the controller 11 identifies the facial portion by the processing of the second face identification processing portion 25. An example of the predetermined conditions is that the first face identification processing portion 22 has failed to recognize any facial portion.

Where the processing of the second face identification processing portion 25 is performed, the controller 11 finds the center of gravity of the portion of the color intrinsic to the subject from the portion included in the search region out of the image data, using the image region including the facial portion recognized within the image data processed in the past (i.e., image data previously processed) by the first face identification processing portion 22 as the initial value of the search region. At first, the values of pixels within the search region giving the initial value and the color intrinsic to the subject are used, the color being stored in the storage portion 12. Using the center of gravity as a center, a new search region is defined.

Subsequently, the center of gravity of the portion of the color intrinsic to the subject within the new search region out of the image data is found. Using this center of gravity as a center, a still new search region is defined. This processing is repeated until the distance between the newly found center of gravity and the immediately previously found center of gravity decreases below a given value (i.e., until the search region is converged). The search region obtained as a result of the convergence when the search region has converged is identified as an image region including a facial portion.

The controller 11 identifies the image region including the facial portion from each set of image data entered in a time-sequenced manner in this way by the first face identification processing portion 22 or second face identification processing portion 25.

The condition under which the image region of the facial portion is identified using the second face identification processing portion 25 is that the first face identification processing portion 22 fails to recognize any facial portion. The invention is not limited to this condition. For example, with respect to image data obtained every given number of steps, for example, out of a sequence of image data entered, the condition may be so set that processing is performed by the first face identification processing portion 22 and processing regarding other image data is performed by the second face identification processing portion 25.

Second Embodiment

The recognition apparatus according to the first embodiment described so far performs processing for recognizing the subject using a color intrinsic to the subject such as information about skin color in a case where a given condition is satisfied. With respect to a subject in motion (a typical example is a human facial portion), the subject can also be recognized based on motion among a sequence of image data instead of information about a color such as skin color.

An example of the recognition apparatus according to the second embodiment using processing for recognition of the subject based on motion as described above is described below. The recognition apparatus according to the present embodiment is fundamentally identical in configuration with the recognition apparatus according to the first embodiment except for a slight difference, i.e., the contents of the program executed by the controller 11. The contents of the program executed by the controller 11 are described below. In the following description, image data at instants of time Ti (i=1, 2, ..., n; T1<T2< ... <Tn) is indicated by P(Ti).

The program executed by the controller 11 of the present embodiment is designed to functionally include image conversion portion 21, first face identification processing portion 22, storage processing portion 31, a face region pursuit portion 32, and third face identification processing portion 33 as shown in FIG. 3. Processing steps similar to those of the first embodiment are indicated by the same reference numerals as in the first embodiment and their detail description is omitted herein.

The storage processing portion 31 stores information (e.g., coordinate information representing the image region) representing the image region including the facial portion identified by the first face identification processing portion 22. The face region pursuit portion 32 determines a candidate region estimated to contain a facial portion in the current image data, based on the results of the recognition (information representing the image region of the facial portion and information about the sense and tilt of the face) of the facial portion regarding image data processed in the past and stored in the storage portion 12. Where information representing an image region is particularly used, if it is assumed that the current image data is given by P(Ti), the face region pursuit portion 32 may treat the information representing the image region of the facial portion in P(Ti−1) directly as a candidate region estimated to contain a facial portion in P(Ti). This is referred to as the zeroth-order approximation. Furthermore, using the amount of movement of the image region of the facial portion in P(Ti−2) and P(Ti−1), an image region obtained by varying the P(Ti−1) by this amount of movement may be taken as a candidate region in P(Ti). This is referred to as the first-order approximation. Subsequently, an image region obtained by performing a given extrapolation calculation using k sets of image data P(Ti−k), ..., P(Ti−1) obtained in the past is similarly taken as a candidate region in P(Ti).

The third face identification processing portion 33 generates vector information (motion history image) representing movement of each pixel by a method of calculating the differences in brightness between pixel values of P(Ti) and adjacent image data P(Ti−1) (or grayscale data items obtained by converting them) out of image data entered in a time-sequenced manner. The processing portion then finds the average amount of movement of each pixel (the average value of the number of pixels that a portion corresponding to each pixel has moved) included in the candidate region delivered by the face region pursuit portion 32. A decision is made as to whether the average amount of movement has exceeded a predetermined threshold value. If the threshold value is exceeded, it is judged that movement has been detected and that the face is within this candidate region. The candidate region is identified as an image region containing the facial portion.

If the result of the decision indicates that the predetermined threshold value is not exceeded, information representing failure of identification (non-detection) of an image region including a facial portion is output.

The recognition apparatus of the present embodiment has the structure as described above and operates as follows. When a sequence of image data taken by an external device such as a camera is entered into the recognition apparatus of the present embodiment in a time-sequenced manner via the input/output interface 13, the controller 11 first performs the processing of the image conversion portion 21 in accordance with the program loaded in the storage portion 12, and stores the image data into the storage portion 12. Also, the controller converts the image data into grayscale data and stores the grayscale data into the storage portion 12.

The controller 11 then starts the processing of the first face identification processing portion 22, takes grayscale data from the storage portion 12, and identifies the candidate of the facial portion using the amount of features of the pixel block such as entropy as described above. Then, using the second database obtained by learning, the image of the candidate of the facial portion is converted and normalized. Using the obtained data and information within the first database obtained by learning of facial images, a decision is made as to whether the image within the region that is a candidate of the facial portion after the normalization is an image of a face. If it is an image of a face, the region that is the candidate is identified as an image region including the facial portion. If the result of the decision is that it is not an image of a face, the processing is repeated from the normalization step about other candidates of facial portions. Where any image of a facial portion cannot be recognized regarding all the candidates of facial portions obtained from the grayscale data, it follows that information to the effect that recognition of facial portions has failed is output.

The controller 11 stores information representing the identified image region into the storage region 12 by the processing of the storage processing portion 31. Where a predetermined condition is satisfied, the controller 11 identifies the facial portion by the processing of the third face identification processing portion 33. An example of the predetermined condition is that the first face identification processing portion 22 has failed to recognize any facial portion.

Where the processing of the third face identification processing portion 33 is performed, the controller 11 determines a candidate region that is estimated to contain a facial portion in the current image data, based on information representing the image region of the facial portion regarding image data processed in the past and stored in the storage portion 12, using the face region pursuit portion 32.

The third face identification processing portion 33 generates vector information representing movement of each pixel between current image data and adjacent image data immediately preceding that image data, and finds the average amount of movement (the average value of the number of pixels that a portion corresponding to each pixel has moved) of each pixel included in the candidate region delivered by the face region pursuit portion 32. Where the average amount of movement exceeds the predetermined threshold value, the candidate region is identified as an image region containing the facial portion.

In this way, in the present embodiment, if the subject person faces backward and the skin color of the face cannot be detected, a supplement is made using the results of the detection of moving regions. Consequently, a facial region or head portion can be detected with higher accuracy. In addition, increase of the amount of calculation can be suppressed by performing processing for detecting moving regions near an image region of a past facial region.

The condition under which the image region of the facial portion is identified by the third face identification processing portion 33 is that the first face identification processing portion 22 fails to recognize any facial portion. The invention is not limited to this condition. For example, with respect to image data obtained every given number of steps, for example, out of a sequence of image data entered, the condition may be so set that processing is performed by the first face identification processing portion 22 and processing regarding other image data is performed by the third face identification processing portion 33.

The processing for detecting moving regions by the third face identification processing portion 33 is not limited to the example described herein. For example, the processing may use the number of pixels (moving pixels) varying between image data, based on the difference in pixel brightness component between current image data and immediately preceding, adjacent image data on the current image data on the time sequence.

Third Embodiment

Furthermore, the processing utilizing skin color (color intrinsic to the subject) in the first embodiment and the detection of moving regions in the second embodiment may be combined with the processing of the first face identification processing portion 22. That is, the controller 11 may combine the steps of processing using the first, second, and third face identification processing portions based on a given condition.

For example, the first face identification processing portion 22 normally identifies an image region of a facial portion from image data entered in a time-sequenced manner. Where the first face identification processing portion 22 can make no identification, the second face identification processing portion 25 checks whether an image region of a facial portion can be identified or not. If no identification can be made again, the third face identification processing portion 33 may be made to perform face identification processing. In this case, if any image region including a facial portion cannot be identified by the third face identification processing portion 33, information to the effect that a decision that there is no person (decision of absence) has been made may be output.

Information about the image region including a facial portion identified by these processing steps is used for other processing (e.g., processing for controlling the direction of the line of sight of a camera such that the image region given range, information to the effect that the state of operation cannot be identified may be given. Information about the image region may be stored in the storage portion 12 as a new candidate for an identified subject.

In the second face identification processing portion 25 in the description of the first (and third) embodiment(s), an example in which an image region including a facial portion identified within image data entered immediately previously is used as a starting point of the search region is shown. Alternatively, the controller 11 may be made to perform processing of the face region pursuit portion 32 in the second embodiment. A candidate region obtained by the face region pursuit portion 32 may be used as the starting point of the search region, i.e., image region giving an initial value.

In addition, the image data entered into the second face identification processing portion 25 may not be image data themselves. Rather, they may be data obtained by converting the image data into data about hue components. This can reduce the effects of brightness variations due to illumination.

In the embodiments described so far, the subject of recognition is a human face. The scope of the invention is not limited to such embodiments. Similar processing can be applied to any subject.

Furthermore, in the case where the aforementioned processing for estimating operations is performed, if is brought into the center of the image data by controlling the tripod head for the camera.

Furthermore, it is possible to perform processing for estimating operations (i.e., estimating what kind of operation is being done by a person, based on information representing the position of an image region including a facial portion on image data and information representing the ratio of the area of the image region to the whole area). In this case, as shown in FIG. 4, information about coordinates defining an image region on image data and information (it may be information about an alphanumeric array such as "during operation of the PC") representing operations of the subject to be identified are interrelated and held in the storage portion 12, using an identifier such as a serial number as a keyword. The controller 11 fetches coordinate information, for example, in the order of serial numbers that are identifiers from the table shown in FIG. 4. The fetched information is compared with information about the image region including the facial portion identified by the aforementioned processing. Where the difference is within a given range, information about the operation related to the coordinate information about the compared subject is output.

Furthermore, where the difference between information about the image region including the facial portion identified at this time and any coordinate information is not within the information about the sense or tilt of a face was obtained by the first face identification processing portion 22 the previous time, the information is also related to the contents of the table shown in FIG. 4. When there are plural operations related to similar pieces of coordinate information, for example, any one of the plural operations may be discerned based on information about the sense of the face.

Figure 5:
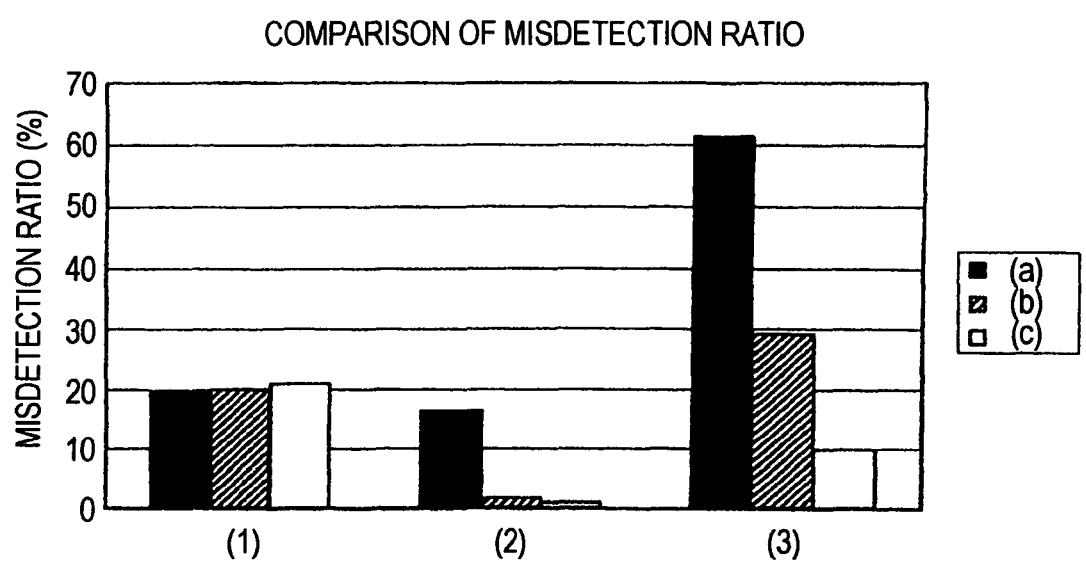
FIG. 5 is a diagram illustrating examples of results of experiments performed on the misdetection reduction effect of a recognition apparatus of the invention in operation-estimating processing.

The results of experiments conducted in a case where the recognition apparatus according to the first and third embodiments are used for processing for estimating operations are next described. When a certain operation A is not performed, there is a probability that the operation A is misrecognized as being performed (1). When images of a person performing the certain operation A are being taken, there is a probability that the person is misdetected as being absent (2). That is, any one of the first through third face-identifying processings cannot identify any image region including a facial portion. When the certain operation A is not performed, there is a probability that the person is misdetected as being absent (3). In case (a), the recognition apparatus uses only the first face identification processing portion 22. In case (b), the first face identification processing portion 22 is combined with the second face identification processing portion 25. This corresponds to the apparatus of the first embodiment. In case (c), the third face identification processing portion 33 is also combined. This corresponds to the apparatus of the third embodiment. The three probabilities (1)-(3) were combined with the three cases (a)-(c). That is, there were 9 combinations. Experiments were performed regarding these 9 combinations. The results are shown in FIG. 5.

The operation A was a work performed in a certain facial position and in a certain sense. Since operations other than the operation A are highly likely to be misrecognized (1) if the corresponding operation is not contained in the table shown in FIG. 4, the apparatus (a)-(c) resulted in misdetections with almost equal probabilities.

However, the probabilities of misrecognitions in the cases (2) and (3) were reduced to about one-sixth.

What is claimed is:

1. A recognition apparatus for recognizing a facial portion of a person containing a face by taking a sequence of color image data, the recognition apparatus comprising:
   an image conversion unit that converts single color image data including the facial portion into single grayscale image data;
   a facial portion-identifying unit that performs a first process that identifies a facial image region of the single grayscale image data, and performs a second process that identifies a facial image region of the single color image data when the first process fails to identify the facial image region;
   an acquisition unit that obtains skin color information about skin color of the person from pixel values within a region of the single color image data corresponding to the facial image region identified by the first process; and
   a storage unit that stores the obtained skin color information as stored skin color information;
   wherein the facial portion-identifying unit performs the second process that identifies the facial image region based on a center of gravity of color, the center of gravity of color being calculated based on the stored skin color information, the stored skin color information being obtained from another single color image data that was converted into another single color grayscale image data and processed by the first process before the single image data.

2. A recognition apparatus for recognizing a facial portion of a person containing a face by taking a sequence of color image data, the recognition apparatus comprising:
   an image conversion unit that converts each color image data into a grayscale image data;
   a facial portion-identifying unit that identifies a facial image region including the facial portion by
      performing a first process that identifies a facial image region of the grayscale image data corresponding to each color image data, and
      performing a second process that identifies a facial image region of each color image data when the first process fails to identify the facial image region in the gray scale image data corresponding to each color image data;
   a detection unit that detects state of movement of a candidate region within image data, the candidate region being determined based on information representing the facial image region, the facial image region being represented by previous image data previously processed; and
   a facial portion region estimation unit that estimates the facial image region within current image data, based on the detected state of movement,
   wherein the detection unit includes a processor, and the detection unit (i) calculates an amount of movement of each pixel in the candidate region based on the current image data and the previous image data, (ii) calculates an average of the amount of movement of all pixels in the candidate region, and (iii) detects the state of movement of the candidate region based on the average, and the amount of movement of each pixel is a number of pixels from a first position at which a portion corresponding to one pixel is within the previous image data to a second position at which that portion is within the current image data.

3. The recognition apparatus according to claim 2, further comprising:

an acquisition unit that obtains skin color information about skin color of the person from pixel values within the facial image region identified by the facial portion-identifying unit; and a storage unit that stores the obtained skin color information as stored skin color information;

wherein the facial portion-identifying unit identifies the facial image region from currently processed image data by using the stored skin color information, the stored skin color information being obtained from previously processed image data, and wherein the facial portion-identifying unit (i) searches one or more candidate regions that have a plurality of pixels that are adjacent within the image data and (ii) identifies one candidate image region as the facial image region based on a position of each pixel in each candidate region and differences between the pixel value of each pixel and the stored skin color information.

4. A recognition apparatus for recognizing a subject by shooting the subject and taking a sequence of color image data, the recognition apparatus comprising:

an image conversion unit that converts single color image data including the facial portion into single grayscale image data;

a subject identifying unit that performs a first process that identifies a subject image region of the single grayscale image data and performs a second process that identifies a subject image region of the single color image data when the first process fails to identify the subject image region;

an acquisition unit that obtains subject color information about a color of the subject from pixel values within a region of the single color image data corresponding to the subject image region identified by the first process; and a storage unit that stores the obtained subject color information as stored subject color information;

wherein the subject identifying unit performs the second process that identifies the subject image region based on a center of gravity of color, the center of gravity of color being calculated based on the stored subject color information, the stored subject color information being obtained from another single color image data that was converted into another single color grayscale image data and processed by the first process before the single image data.

5. A recognition apparatus for recognizing a subject by shooting the subject and taking a sequence of color image data, the recognition apparatus comprising:

an image conversion unit that converts each color image data into a grayscale image data;

a subject portion-identifying unit that identifies a subject image region including the subject by performing a first process that identifies a facial image region of the grayscale image data corresponding to each color image data, and performing a second process that identifies a facial image region of each color image data when the first process fails to identify the facial image region in the gray scale image data corresponding to each color image data;

a detection unit that detects state of movement of a candidate region within previous image data previously processed, the candidate region being determined based on information representing the subject image region; and a subject region estimation unit that estimates the subject image region based on the detected state of movement, the image region being represented by current image data, wherein the detection unit includes a processor, and the detection unit (i) calculates an amount of movement of each pixel in the candidate region based the current image data and the previous image data, (ii) calculates an average of the amount of movement of all pixels in the candidate region, and (iii) detects the state of movement of the candidate region based on the average, and the amount of movement of each pixel is a number of pixels from a first position at which a portion corresponding to one pixel is within the previous image data to a second position at which that portion is within the current image data.

6. A computer-implemented method of recognizing a facial portion of a person containing a face by taking a sequence of color image data, which has been obtained by shooting pictures including at least a portion of the person containing the face, and recognizing the facial portion from the image data, the method comprising:

a processor converting single color image data including the facial portion into single grayscale image data;

a processor performing a first process that identifies a facial image region of the single grayscale image data;

a processor performing a second process that identifies a facial image region of the single color image data when the first process fails to identify the facial image region;

a processor obtaining skin color information about skin color of the person from pixel values within a region of the single color image data corresponding to the facial image region identified by the first process; and a processor storing the obtained skin color information into a storage unit as stored skin color information;

wherein in the step of performing the second process, the stored skin color information, that is associated with image data previously processed, is used for processing the facial image region based on a center of gravity of color, the center of gravity of color being calculated based on the stored skin color information, the stored skin color information being obtained from another single color image data that was converted into another single color grayscale image data and processed by the first process before the single image data.

7. A computer-implemented method used by a recognition device, the method of recognizing a facial portion of a person containing a face by taking a sequence of color image data, which has been obtained by shooting pictures including at least a portion of the person containing the face, and recognizing the facial portion from the image data, the method comprising:

an image conversion unit that converts each color image data into a grayscale image data;

a processor identifying a facial image region including the facial portion by performing a first process that identifies a facial image region of the grayscale image data corresponding to each color image data, and performing a second process that identifies a facial image region of each color image data when the first process fails to identify the facial image region in the gray scale image data corresponding to each color image data;

a processor detecting state of movement of a candidate region within previous image data previously processed, the candidate region being determined based on information representing the facial image region; and a processor estimating the image region including the facial portion within current image data, based on the detected state of movement, wherein when the state of movement is detected, (i) an amount of movement of each pixel in the candidate region is calculated based on the current image data and the previous image data, (ii) an average of the amount of movement of all pixels in the candidate region is calculated, and (iii) the state of movement of the candidate region is detected based on the average, and the amount of movement of each pixel is a number of pixels from a first position at which a portion corresponding to one pixel is within the previous image data to a second position at which that portion is within the current image data.

8. A computer readable non-transitory medium encoded with computer readable instructions for recognizing a facial portion of a person containing a face by taking a sequence of color image data, the instructions comprising:

converting single color image data including the facial portion into single grayscale image data;

performing a first process that identifies a first facial image region of the single grayscale image data;

performing a second process that identifies a facial image region of the single color image when the first process fails to identify the facial image region;

obtaining skin color information about skin color of the person from pixel values within a region of the single color image data corresponding to the facial image region identified by the first process; and storing the obtained skin color information into a storage unit as stored skin color information;

whereby in the instruction of performing the second process, the facial image region is identified based on a center of gravity of color, the center of gravity of color being calculated based on the stored skin color information, the stored skin color information being obtained from another single color image data that was converted into another single color grayscale image data and processed by the first process before the single image data.

9. A computer readable non-transitory medium encoded with computer readable instructions for recognizing a facial portion of a person containing a face by taking a sequence of color image data, the instructions comprising:

an image conversion unit that converts each color image data into a grayscale image data;

identifying a facial image region including the facial portion by performing a first process that identifies a facial image region of the grayscale image data corresponding to each color image data, and performing a second process that identifies a facial image region of each color image data when the first process fails to identify the facial image region in the gray scale image data corresponding to each color image data;

detecting state of movement of a candidate region within previous image data previously processed, the candidate region being determined based on information representing the facial image region including the identified facial portion; and estimating the image region including the facial portion within the current image data based on the detected state of movement, wherein when the state of movement is detected, (i) an amount of movement of each pixel in the candidate region is calculated based on the current image data and the previous image data, (ii) an average based on amounts of movement of all pixels in the candidate region is calculated, and (iii) the state of movement of the candidate region is detected based on the average, and the amount of movement of each pixel is a number of pixels from a first position at which a portion corresponding to one pixel is within the previous image data to a second position at which that portion is within the current image data.

* * * * *